Sept. 28, 1971 C. H. PRESCOTT 3,608,216
SNOW PLOW ATTACHMENT FOR REAR WHEEL DRIVE VEHICLES
Filed March 20, 1970 3 Sheets-Sheet 2
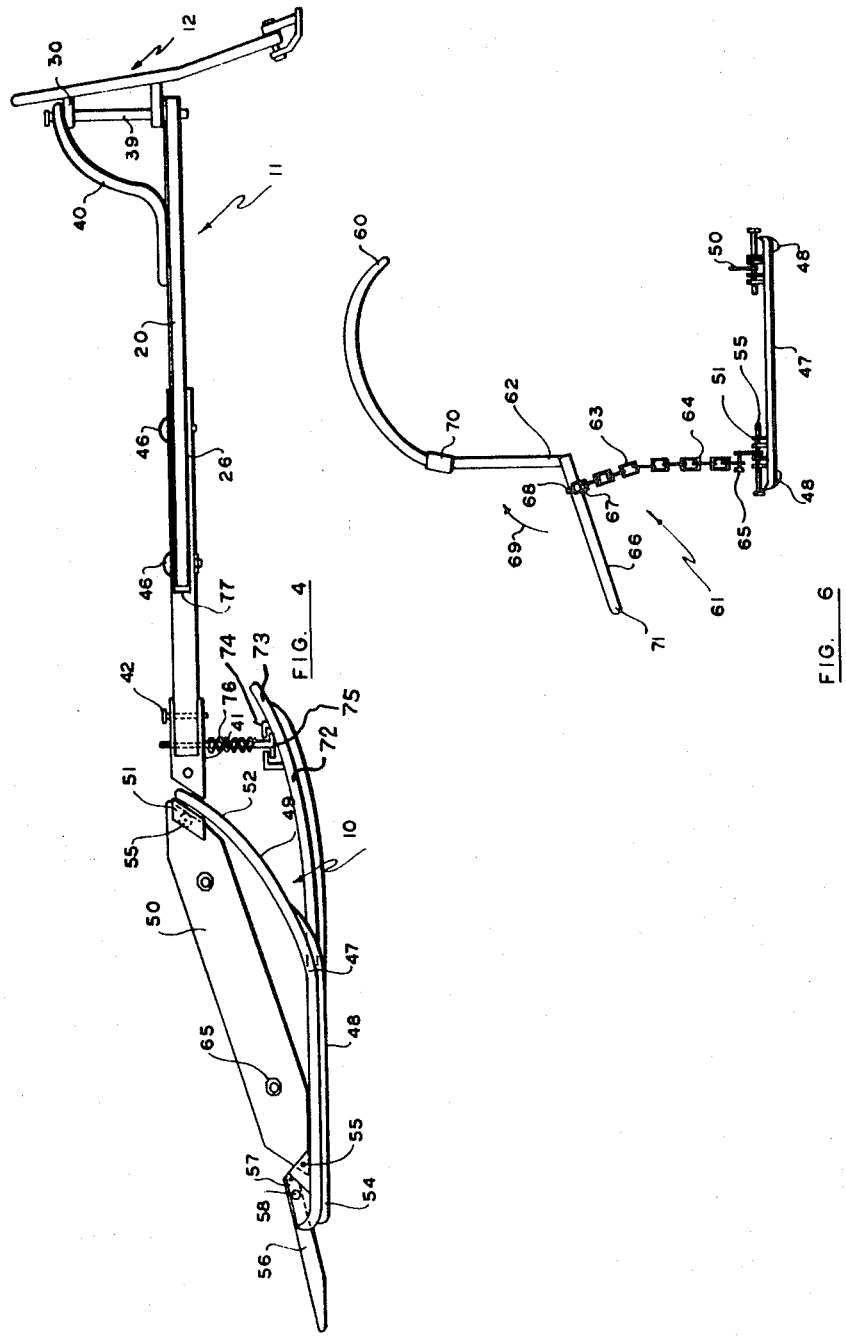

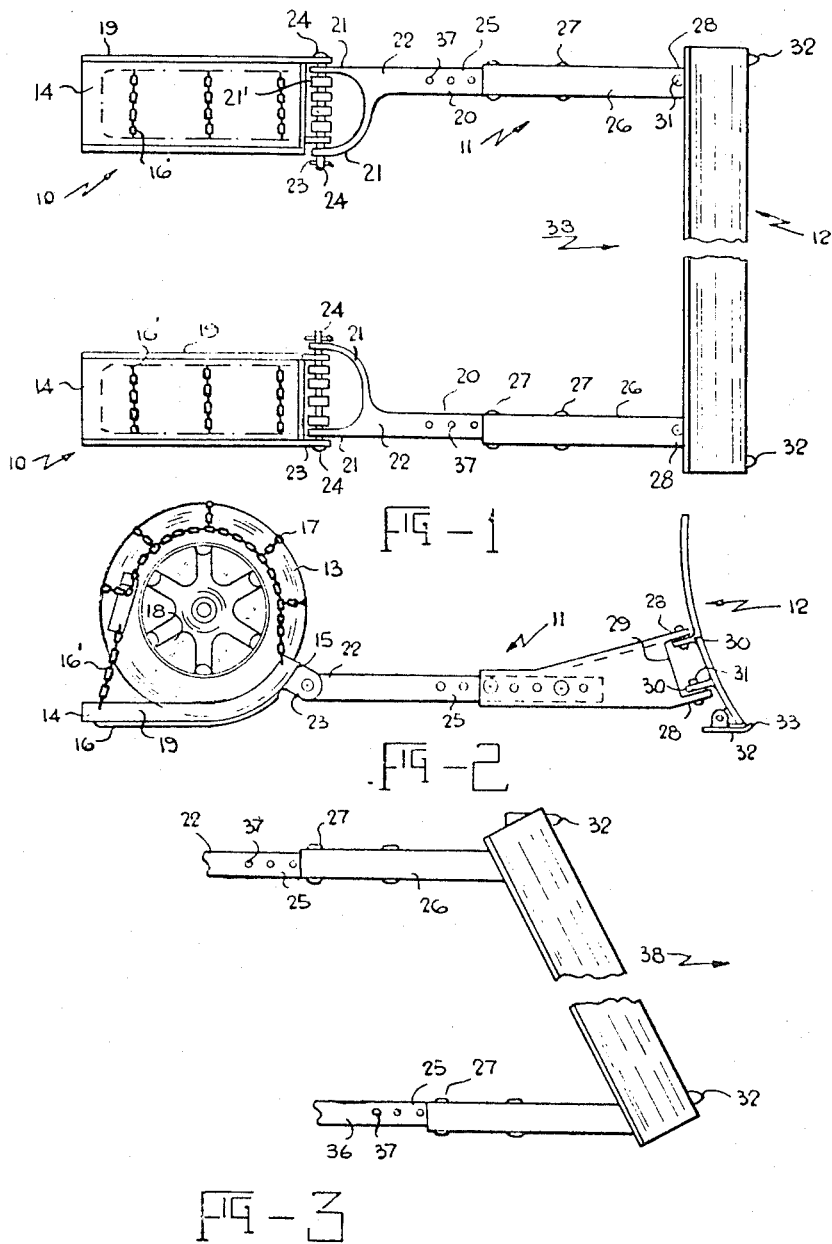

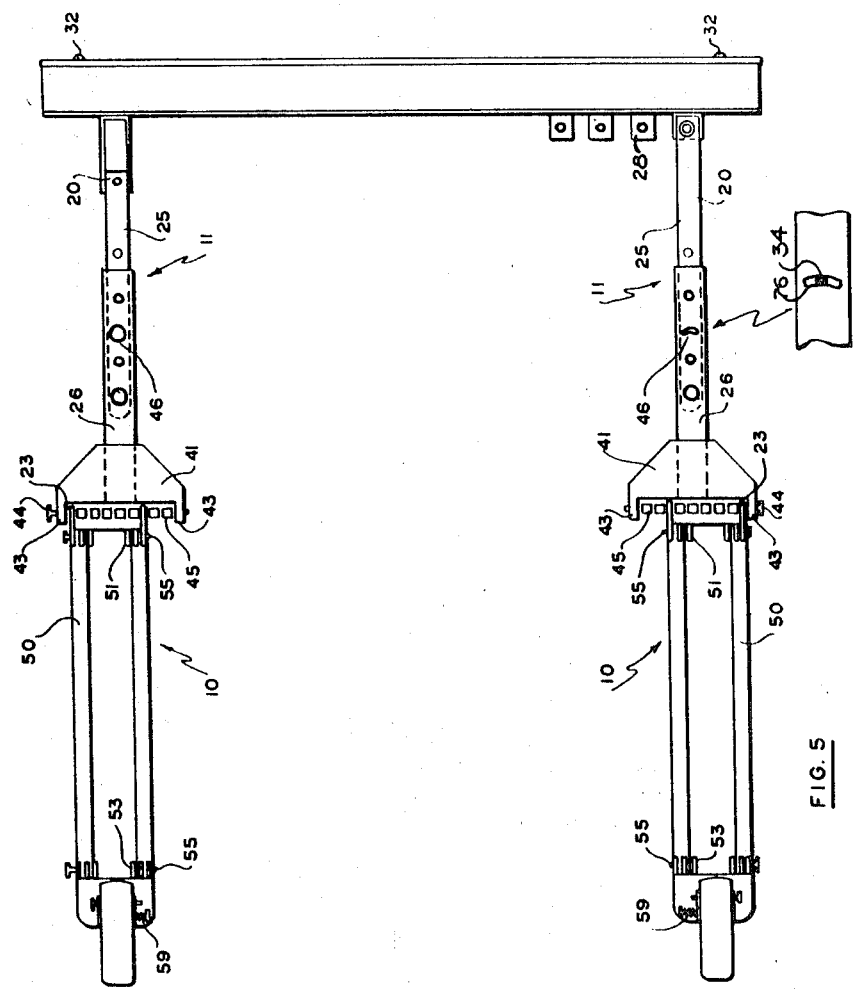

United States Patent Office 3,608,216
Patented Sept. 28, 1971

3,608,216
SNOW PLOW ATTACHMENT FOR REAR WHEEL
DRIVE VEHICLES
Clovis H. Prescott, Box 4-322, R.R. 3,
Winnipeg, Manitoba, Canada
Continuation-in-part of applications Ser. No. 766,733,
Oct. 11, 1968, and Ser. No. 877,113, Nov. 17, 1969.
This application Mar. 20, 1970, Ser. No. 21,408
Int. Cl. E01h 5/06
U.S. Cl. 37—42R
10 Claims

ABSTRACT OF THE DISCLOSURE

A snow plow attachment for vehicles and comprises a plowing blade held on a pair of side beams which are adjustable in length to varying inclination of the blade. The beams are in turn secured by horizontal pivots to pans or trays upon which the front wheels of the vehicle engage and chains hold the trays to the wheels so that when the wheels are turned, the snow plow also turns.

---

This application is a continuation-in-part of applications Ser. Nos. 766,733 and 877,113, filed Oct. 11, 1968, and Nov. 17, 1969, respectively, both now abandoned.

This invention relates to new and useful improvements in snow plow attachment for vehicles, particularly cars or trucks normally having rear wheel drive and steerable front wheels.

There are many snow plow attachments for cars or trucks which are secured either to the front bumper or the front frame members of the vehicle.

These suffer from several disadvantages, the principal one being that such devices, being secured to the frame, do not follow the direction of travel of the vehicle accurately. A snow plow attachment extending outwardly and in front of the bumper by several feet, tends to go straight on when the wheels are turned until the vehicle completes the turn. In other words, the snow plow attachment described a much wider sweep than the wheels.

A second disadvantage is the fact that it is difficult to provide readily attachable and detachable means to secure the snow plow attachment properly to the vehicle.

The present invention overcomes all of these disadvantages inasmuch as the device is steered directly by the front wheels and the front wheels are merely driven onto the skids and locked in place.

This gives accurate and prompt turning of the attachment when the wheels are turned and at the same time provides easy attachment and detachment.

Another advantage of the present device is the fact that it can easily be used for moving snow either straight ahead or to one side or the other inasmuch as the blade can be angled readily with respect to the direction of travel.

A yet further object of the invention contemplates the attachment of a snow blower rather than a snow plow blade.

A yet further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination or parts, or new use of any of the foregoing, of which concept, one or more specific embodiments of same are herein exemplified as illustrative only of such concept, reference being had to the accompanying figures in which:

FIG. 1 is a top plan view of the device.

FIG. 2 is a side elevation of FIG. 1 but showing one front wheel of a vehicle in place.

FIG. 3 is a fragmentary top plan view showing the blade angled for the deposition of snow on one side thereof.

FIG. 4 is a side elevation of the preferred embodiment.

FIG. 5 is a top plan view of FIG. 4.

FIG. 6 is a front elevation of one of the wheel holding devices per se.

In the drawings like characters of reference indicate corresponding parts in the different figures.

Proceeding therefore to describe the invention in detail, reference should first be made to FIG. 1 in which 10 illustrates generally a wheel receiving skid, 11 the general frame, and 12 the snow plow blade portion.

I have provided a pair of skids 10 to receive the front wheels 13 of the associated vehicle.

Each skid takes the form of a metal trough 14 within which the wheels 13 may nest and it will be observed that the front ends 15 of these troughs curve upwardly to facilitate the movement thereof across the snow surface. If desired, small longitudinally extending keels 16 may be formed on the underside to assist in the steering action.

Means are provided to detachably secure the wheels 13 to the skids 14 and take the form of chain assemblies 16' secured to the skids and adapted to engage chain assemblies 17 which may be secured to the front wheels 13. Alternatively, the chain assemblies 16' may pass through apertures 18 within the wheels if such apertures are provided. Irrespective of the wheel construction, the chain assemblies 16' are provided with chain tightening and locking assemblies (not illustrated) but which are well known in the tire chain art.

The trough pans 14 are preferably provided with upstanding sides 19 to stabilize the wheel 13 when the vehicle is driven onto the trough pans and locked in place.

The frame 11 comprises a pair of spaced and parallel longitudinally extending members 20 having spaced and parallel attaching members 21 secured to one end 22 thereof. These portions 21 engage between lugs 23 secured to and extending forwardly from the skids 10 and are held in position by means of pivot pins 24 extending horizontally so that the frame members 20 may pivot around the skids in a vertical plane.

Each frame member 20 comprises a fixed portion 25 and a telescopic adjustable portion 26 slidable therewithin so that the length of the frame members may be adjusted within limits, pins 27 engaging apertures within the portions 25 and 26 as clearly illustrated.

Lugs 28 are formed upon the front or other end 29 of the frame members and engage within pairs of lugs 30 extending rearwardly from a snow plow blade 12, and are connected to lugs 28 by means of vertically situated pivot pins 31.

The snow plow blade 12 is curved when viewed from the end as shown in FIG. 2 and is provided with a ground engaging runner 32 adjacent each end thereof which takes the form of a relatively small curved ski with upturned front end 33.

In operation, the front wheels of the vehicle are driven onto the trough pans 14 and are secured thereto by means of the chain assemblies 16'. The angle of inclination of the snow plow blade 12 is adjusted to suit the conditions and the vehicle is driven forwardly in the direction of arrow 38 thus bulldozing the snow to one side thereof. As the wheels 13 are turned by the steering mechanism of the vehicle, the snow plow attachment turns concurrently therewith thus enabling the device to be used in relatively narrow locations.

FIGS. 4, 5 and 6 show the preferred embodiment of my device and, where applicable, corresponding reference characters have been used for corresponding parts.

The snow plow blade 12 is provided with lugs 30 and a relatively long pivot pin 39 secures the snow plow blade 12 to the longitudinal members of the frame 11.

A plurality of these pairs of lugs 30 is provided to permit limited adjustment of the width of the side members 20 in order to allow alignment with different track widths.

A curved brace member 40 is secured to the upper side of the frame member 11 and is engaged by pivot pin 39 above the uppermost lug 30 as clearly shown in FIG. 4. At the rear ends of the longitudinal frame members 20, I have provided a stiffening bracket 41 secured by bolts 42 and having a pair of spaced and parallel lugs 43 formed on the rear side thereof as shown in FIG. 5.

Pivot pin 44 extends between these lugs and mounts the wheel receiving skids 10 in a manner similar to that described in the previous embodiment.

A plurality of spacers 45 are provided on the pivot pins 44 and the lugs 23 of the skids 10 may be mounted on the pins between the spacers which provide limited sideways adjustment so that the skids can receive wheels of different track widths within limits.

The skids 10 comprise a substantially planar base 47 having longitudinally extending keels 48 upon the underside for control purposes.

The front end 49 of this base curves upwardly as clearly shown and a pair of side plates 50 are adjustably mounted between lugs 51 adjacent the upper end 52 of the base and lugs 52 adjacent the rear end 53 thereof then lug 53 adjacent the rear end 54 thereof. A plurality of these lugs are provided so that the side plates can be maintained in spaced and parallel relationship by means of bolts or pins 55 and the distance between these side plates can be varied within limits to receive wheels of various widths.

Ramps 56 are secured between lugs 57 immediately behind lugs 55 and these ramps facilitate the driving of the car upon the skids. These ramps can be pivoted upwardly around pivot pins 58 when the car is in position and locked in position by means of a spring loaded pin 59.

FIG. 6 shows the preferred method of holding the wheels of the vehicle onto the skids comprising an arcuately curved member 60 adapted to engage over the upper side of the tire 13. The arcuately curved portion of the member 60 is curved in two planes to embrace the majority of the upper side of the tire 13 and locking assemblies 61 are provided at each end of this member 60 adjacent the lower vertical side 62 thereof. These locking assemblies consist of chains 63 anchored by the lower ends 64 thereof to bolts 65 in the side plates 50 and locking lever 66 pivoted to the aforementioned lower ends of the vertical portion 62. The upper end 67 of the chains engages over a hook 68 so that when the lever is moved upwardly in the direction of arrow 69, an over-center action occurs thus drawing the members 60 downwardly into engagement with the tire 13. A sliding clip 70 on the vertical member 62 may slide downwardly and engage over the end 71 of the locking lever when it is in the locked position thus preventing it from unlocking.

In FIG. 4 I show extensions 72 of the skids forwardly of the curved front end 49. The keel 48 extends under this extension as shown at 48'. This extension 72 also curves upwardly as at 73 and is provided with a transverse spring mounting track 74 which receives a block 75 slidable across said track. The lower end of spring 76 is secured to this block and the upper end to bolt 42' which extends through bracket 41 and is provided with a nut on the upper end thereof thus giving limited adjustment to the compression of spring 76.

This compression spring 76 applies pressure to the extensions 72 of the skids and assists in control thereof. As the wheels turn, this extension moves from side to side of the member 41 and the track 74 permits the block 75 to remain substantially below member 41 at all times thus enabling spring 76 to apply pressure vertically downwardly at all times.

The design parameters of modern automobile steering mechanisms dictate that the front wheels follow different radii when turning. In order to prevent the blade from skidding during a turn, I have provided a pivot pin 46 on one side member between portions 25 and 26 thereof. Rearwardly of this pivot pin I provide a control pin 34 engageable with an aperture in the end of portion 25 and engageable within arcuately curved slots 76 formed in the upper and lower flanges of the portion 26. The side walls of portions 26 are removed forwardly of point 77 to permit this limited pivotal action between these portions 25 and 26 and it should be noted that this pivotal action is on one side member only in order to allow for the different radius of turn of the wheels.

Various modifications can be made within the scope of the inventive concept which is herein disclosed and/or claimed.

What is claimed to be the present invention is:

1. An attachment for vehicles which includes a pair of rear drive wheels and a pair of steerable front wheels, said attachment adapted to be detachably engaged by and detachably connected to said front wheels and to be steered thereby; said attachment comprising in combination a pair of front wheel engaging skids, means on said skids for detachably securing said skids to said front wheels, a snow moving component, frame means extending between said skids and snow moving component, extension skids extending forwardly of said front wheel engaging skids, compression spring means extending between said frame means and said extension skids to apply downward pressure to said extension skids, and mean mounting the lower end of said spring to said extension skids, said means including a transverse track on said extension skid, a block slidable in said track, said spring being secured to said block.

2. The device according to claim 1 in which said frame means includes a pair of spaced and parallel longitudinally extending members pivotally connected by one end thereof to said skids for movement in a vertical plane.

3. The device according to claim 2 in which said component is pivotally connected by vertical pivots to the other ends of said members.

4. The device according to claim 3 which includes means to adjust the length of said longitudinal members within limits.

5. The device according to claim 2 which includes means to adjust the length of said longitudinal members within limits.

6. The device according to claim 2 in which each of said skids includes a base plate and a pair of side plates extending upwardly and spaced and parallel relationship from said base plate.

7. The device according to claim 1 in which said component takes the form of a scraper plow blade, and ground engaging runners on the underside of said blade.

8. The device according to claim 7 in which each of said skids includes a base plate and a pair of side plates extending upwardly and spaced and parallel relationship from said base plate.

9. The device according to claim 1 in which each of said skids takes the form of a wheel engaging trough pan, and an upwardly curving front end formed on said pan, said means on said skids for detachably securing said skids to said front wheels comprising attachment chains secured to said skids and detachably engaging said front wheels.

10. The device according to claim 1 in which each of said skids includes a base plate and a pair of side plates extending upwardly and spaced and parallel relationship from said base plate.

References Cited
UNITED STATES PATENTS

| | | | |
|---|---|---|---|
| 1,151,091 | 8/1915 | Dodge | 37—41 |
| 1,392,166 | 9/1921 | Immer | 37—41 |
| 1,498,690 | 6/1924 | Hunziker | 37—42 |
| 1,776,788 | 9/1930 | Gettelman | 37—42 |
| 1,918,771 | 7/1933 | Meyer | 37—42 |
| 2,234,645 | 3/1941 | Hetzelt | 37—42 |
| 2,365,597 | 12/1944 | Roth | 37—42 |
| 2,420,591 | 5/1947 | Frame et al. | 37—42 |
| 2,565,337 | 8/1951 | Allan | 37—42 |
| 2,816,772 | 12/1957 | La Pointe | 37—41X |
| 3,470,632 | 10/1969 | Carlton | 37—44 |

FOREIGN PATENTS

| | | | |
|---|---|---|---|
| 63,338 | 1941 | Norway | 37—42 |
| 1,254,966 | 1961 | France | 37—42 |

ROBERT E. PULFREY, Primary Examiner

C. D. CROWDER, Assistant Examiner

U.S. Cl. X.R.

172—80